United States Patent
Schroeter

(10) Patent No.: US 12,442,925 B2
(45) Date of Patent: Oct. 14, 2025

(54) DETERMINING WEIGHTS OF POINTS OF A POINT CLOUD BASED ON GEOMETRIC FEATURES

(71) Applicant: NVIDIA Corporation, Santa Clara, CA (US)

(72) Inventor: Derik Schroeter, Fremont, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 396 days.

(21) Appl. No.: 18/057,582

(22) Filed: Nov. 21, 2022

(65) Prior Publication Data
US 2023/0121226 A1    Apr. 20, 2023

Related U.S. Application Data

(63) Continuation-in-part of application No. 16/910,742, filed on Jun. 24, 2020, now Pat. No. 11,514,682.

(60) Provisional application No. 62/866,504, filed on Jun. 25, 2019, provisional application No. 62/865,855, filed on Jun. 24, 2019.

(51) Int. Cl.
  *G01S 17/89*    (2020.01)
  *G01S 17/931*    (2020.01)

(52) U.S. Cl.
  CPC ............ *G01S 17/89* (2013.01); *G01S 17/931* (2020.01)

(58) Field of Classification Search
  CPC ... G01S 17/89; G01S 17/931; G01C 21/3841; G06V 20/56
  See application file for complete search history.

(56) References Cited

U.S. PATENT DOCUMENTS

| 9,661,470 | B1* | 5/2017 | Du Bois | G01S 17/86 |
| 2013/0028482 | A1* | 1/2013 | Crews | G01S 17/89 |
| | | | | 382/106 |
| 2015/0233720 | A1 | 8/2015 | Harada | |

(Continued)

FOREIGN PATENT DOCUMENTS

WO    2019/040997 A1    3/2019

OTHER PUBLICATIONS

Gojcic et al, The Perfect Match: 3D Point Cloud Matching with Smoothed Densities, 2019, arXiv:1811.06879v3, pp. 1-15. (Year: 2019).*

(Continued)

*Primary Examiner* — Kathleen M Broughton
(74) *Attorney, Agent, or Firm* — Maschoff Brennan

(57) ABSTRACT

According to one or more embodiments, operations may comprise obtaining a first point cloud. The operations also comprise performing segmentation of the first point cloud, the segmentation generating one or more clusters of points of the point cloud. The operations also comprise determining, for each respective cluster of the plurality of clusters, a respective geometric feature of a corresponding object that corresponds to the respective cluster. The operations also comprise obtaining a second point cloud. The operations also comprise assigning a plurality of weights that comprises assigning a respective weight to each respective cluster based on the respective geometric feature that corresponds to the respective cluster. The operations also comprise obtaining a second point cloud and aligning the first point cloud with the second point cloud based on the plurality of weights.

19 Claims, 13 Drawing Sheets

(56) References Cited

U.S. PATENT DOCUMENTS

| | | | |
|---|---|---|---|
| 2015/0331111 | A1 | 11/2015 | Newman et al. |
| 2016/0364917 | A1* | 12/2016 | Zhang .................... G06T 17/00 |
| 2017/0046840 | A1 | 2/2017 | Chen et al. |
| 2017/0220887 | A1 | 8/2017 | Fathi et al. |
| 2018/0075648 | A1 | 3/2018 | Moghadam et al. |
| 2018/0304468 | A1 | 10/2018 | Holz |
| 2019/0188872 | A1 | 6/2019 | Aflalo et al. |
| 2020/0320339 | A1* | 10/2020 | Rawashdeh ............. G01S 17/42 |
| 2020/0401817 | A1* | 12/2020 | Schroeter .................. G06T 7/50 |
| 2021/0124351 | A1* | 4/2021 | Chen .................... G01S 13/865 |

OTHER PUBLICATIONS

Nagy et al., Real-Time Point Cloud Alignment for Vehicle Localization in a High Resolution 3D Map, in Proceedings of European Conference on Computer Vision, pp. 226-239, Jan. 23, 2019.
PCT International Search Report and Written Opinion issued in corresponding application No. PCT/US2020/039468, dated Oct. 6, 2020.

* cited by examiner

DETERMINING WEIGHTS OF POINTS OF A POINT CLOUD BASED ON GEOMETRIC FEATURES

CROSS-REFERENCE TO RELATED APPLICATION

This patent application is a continuation of U.S. patent application Ser. No. 16/910,742, filed on Jun. 24, 2020, which claims the benefit of and priority to U.S. Provisional App. No. 62/865,855 filed Jun. 24, 2019 and U.S. Provisional App. No. 62/866,504 filed Jun. 25, 2019, the disclosures of each of which are hereby incorporated herein by this reference in their entireties.

FIELD

This disclosure relates to determining weights of points of a point cloud based on geometric features.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or otherwise may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more embodiments, operations may comprise obtaining a first point cloud. The operations also comprise performing segmentation of the first point cloud, the segmentation generating one or more clusters of points of the point cloud. The operations also comprise determining, for each respective cluster of the plurality of clusters, a respective geometric feature of a corresponding object that corresponds to the respective cluster. The operations also comprise obtaining a second point cloud. The operations also comprise assigning a plurality of weights that comprises assigning a respective weight to each respective cluster based on the respective geometric feature that corresponds to the respective cluster. The operations also comprise obtaining a second point cloud and aligning the first point cloud with the second point cloud based on the plurality of weights.

BRIEF DESCRIPTION OF THE DRAWINGS

Example embodiments will be described and explained with additional specificity and detail through the use of the accompanying drawings in which.

Figure 1:
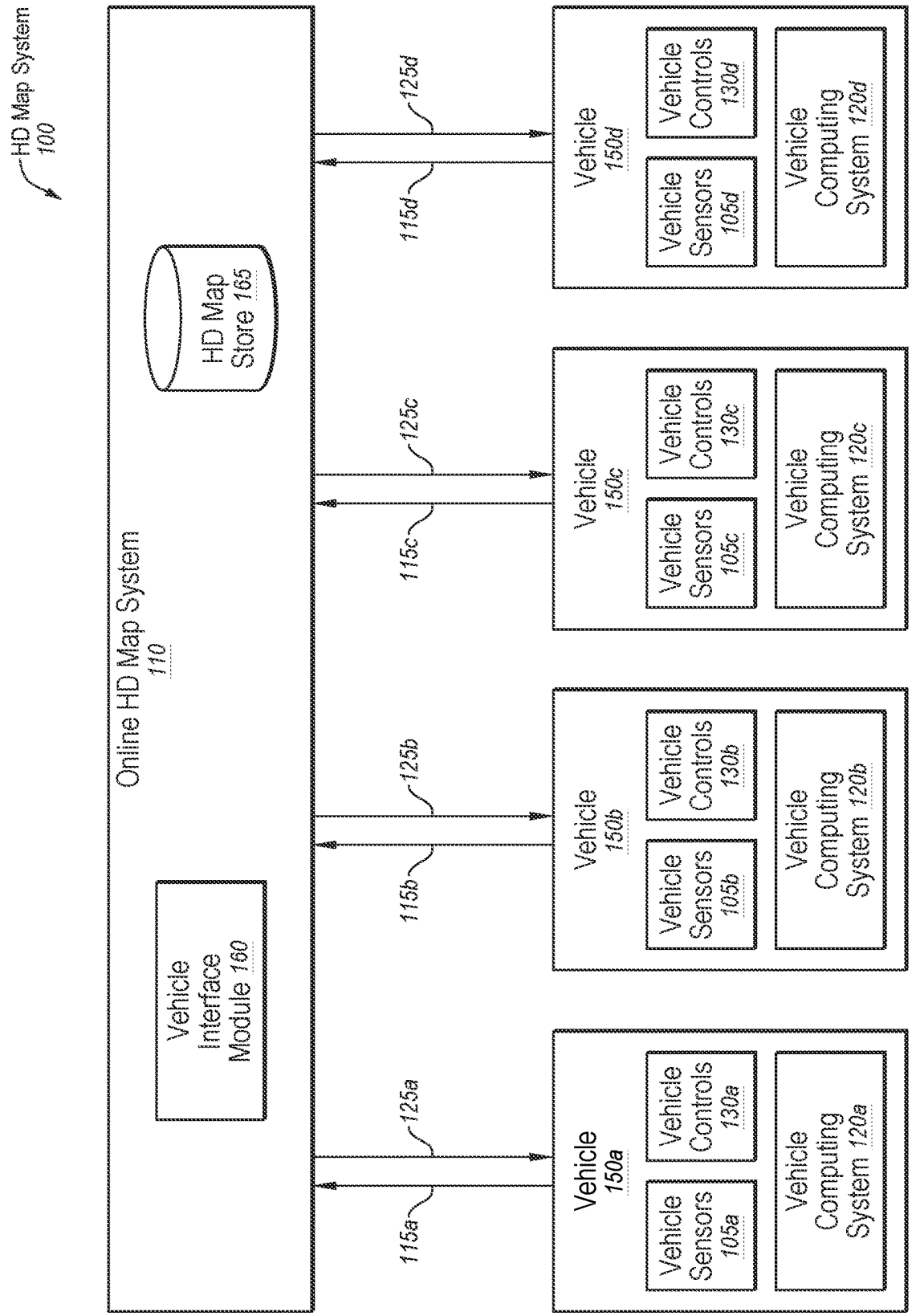
FIG. 1 illustrates an example overall system environment of an HD map system interacting with multiple vehicle computing systems.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

Overview

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure relate to identifying dynamic objects. Examples of dynamic objects include vehicles such as cars, bicycles, motorcycles, and so on as well as pedestrians. Dynamic objects have a high likelihood of changing from one lidar scan to another lidar scan captured for the same region (or from the same location). Accordingly, a dynamic object may move its position or orientation from one lidar scan to another, even if the two lidar scans were captured within a short time interval. Furthermore, dynamic objects may be present in one lidar scan and not present in another lidar scan, even if the two lidar scans were captured by the same vehicle or by different vehicles but within a reasonably short time interval, for example, within a few days of each other, within a few hours of each other, within a few minutes of each other, or even within a few seconds of each other. In contrast, static objects/structures are objects/structures that are less likely to change from one lidar scan to another. Examples of static objects/structures include buildings, poles, trees, traffic signs, ground, and so on. Some of the static structures may also change over time, for example, a building may be demolished or a new building built in a place where there was no building before. However, these changes are rare and happen very slowly over very long time intervals, for example, over years or months.

Identification of the dynamic objects may allow for improved localization of vehicles using HD map data by ignoring the dynamic objects that are included in the lidar scans while comparing the lidar scans against the HD map data. Further, identification of the dynamic objects may also improve updating of the HD map data by removing the dynamic objects from lidar scans that may be used to update the HD map data. In addition, identification of dynamic objects may improve the safety of autonomous vehicles by identifying objects that may potentially move into the path of the autonomous vehicle. These are a few examples as to how identification of dynamic objects may be beneficial, but they are not limiting.

Additionally or alternatively, some embodiments of the present disclosure relate to determining weights of points of a point cloud based on geometric features. The points of a point cloud may represent objects, structures, etc. Some points of a point cloud may be more useful for aligning one or more point clouds than others. For example, the points of a point cloud that may represent a thin vertical structure such as a pole or a tree trunk may be more useful to determine correspondences between various point clouds and may be more useful for aligning one or more point clouds and/for vehicle localization than other points. In some embodiments, it may be useful to segment a point cloud into one or more clusters of points with one or more similar properties, characteristics, etc. to increase the efficiency of aligning one or more point clouds and to conserve resources that may be required for aligning one or more point clouds. For example, a first point cloud may be segmented into one or more clusters of points. The one or more clusters of points may be used to determine geometric features of an object. The geometric features of the object may assist in the determination of one or more correspondences between the first point cloud and a second point cloud. The one or more correspondences may assist with aligning one or more point clouds.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
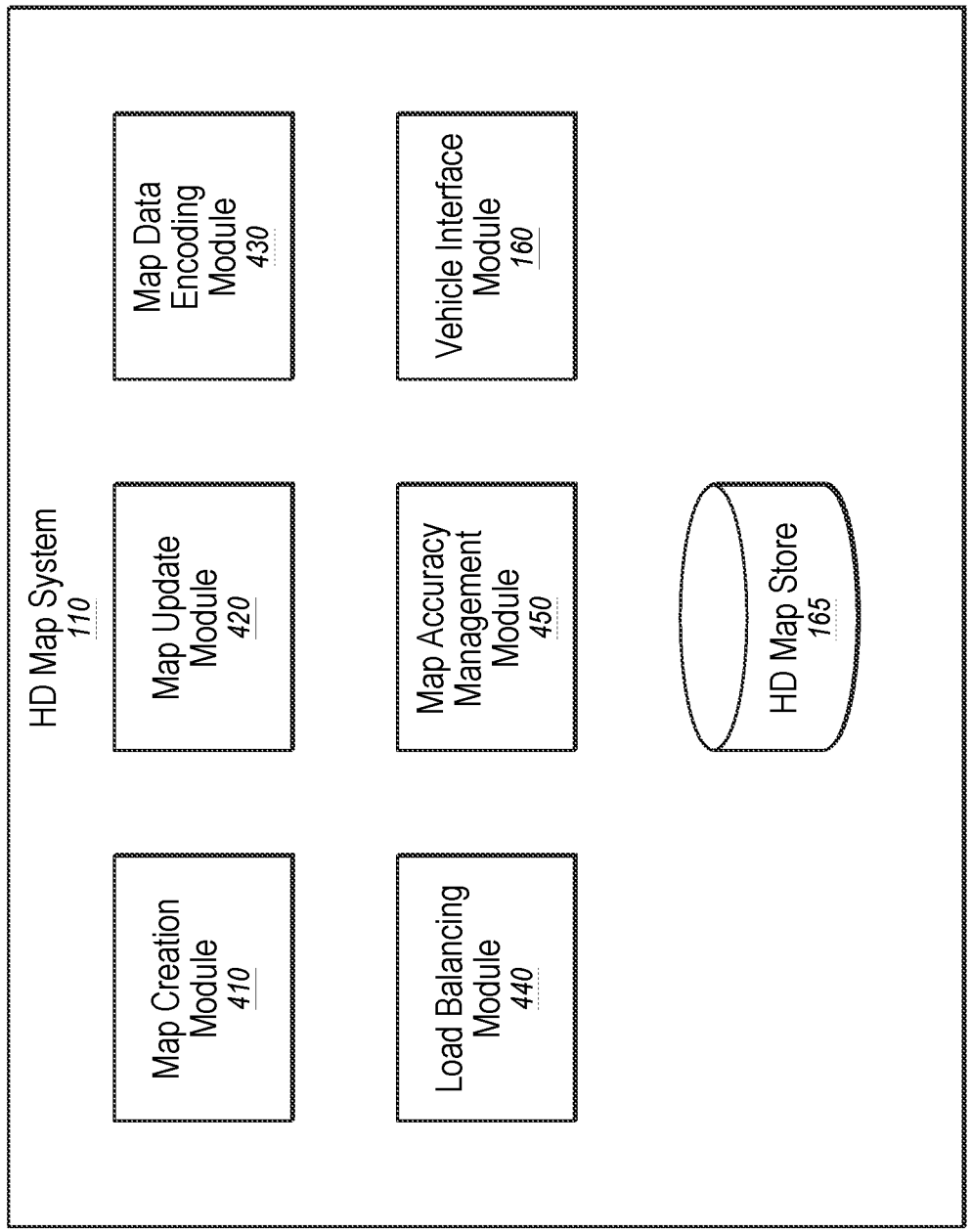
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include light detection and ranging sensor (LIDAR) data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g, that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g, the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105*a-d*), vehicle controls 130 (e.g., vehicle controls 130*a-d*), and a vehicle computing system 120 (e.g., vehicle computer systems 120*a-d*). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a LIDAR, a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
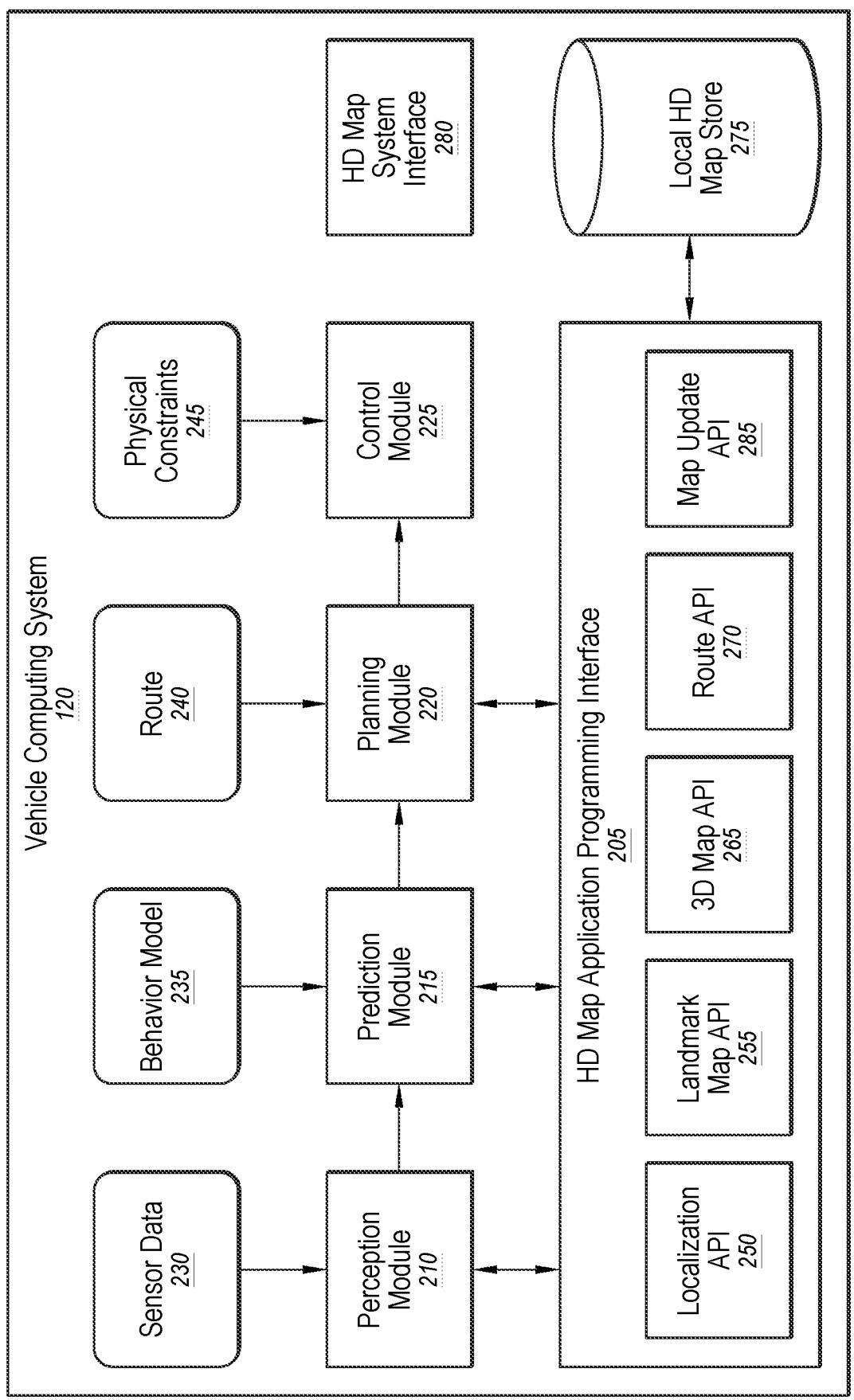
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
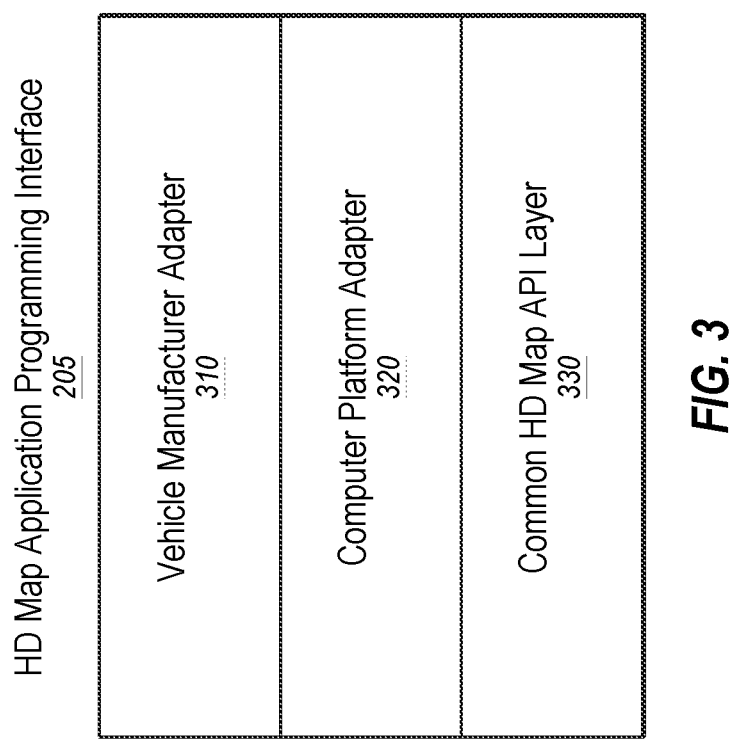
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
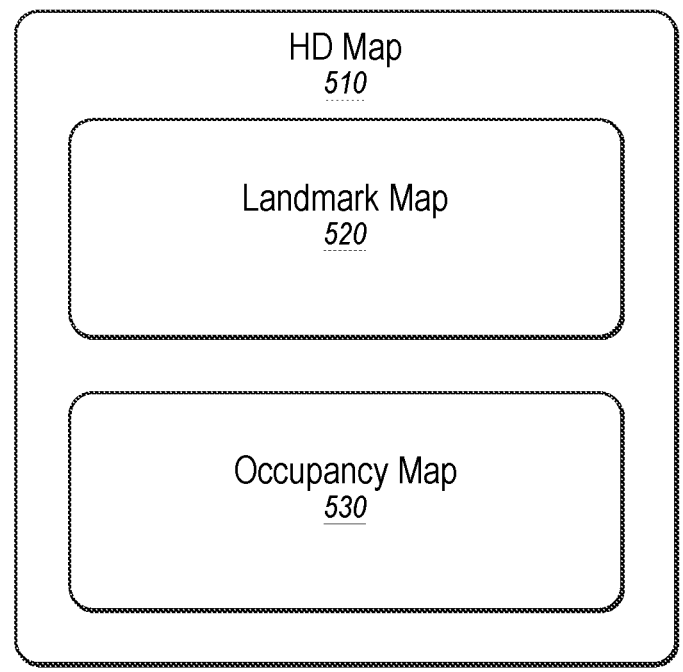
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high precision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying 4×10$^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
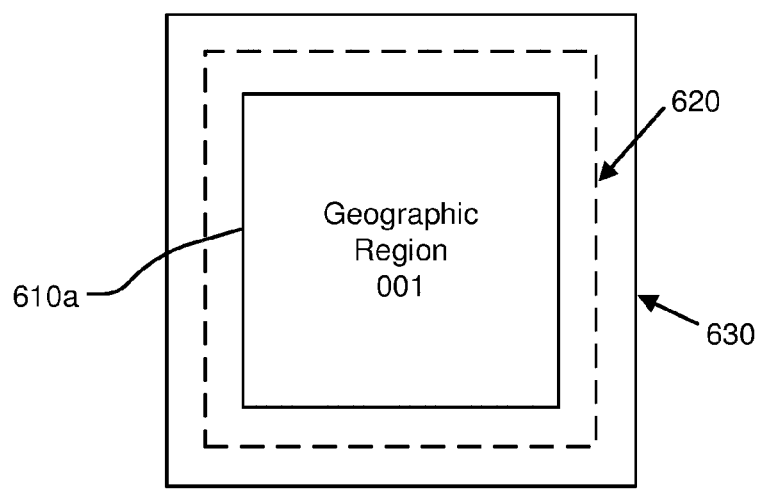
FIGS. 6A-6B illustrate example geographical regions defined in an HD map.
Figure 6B:
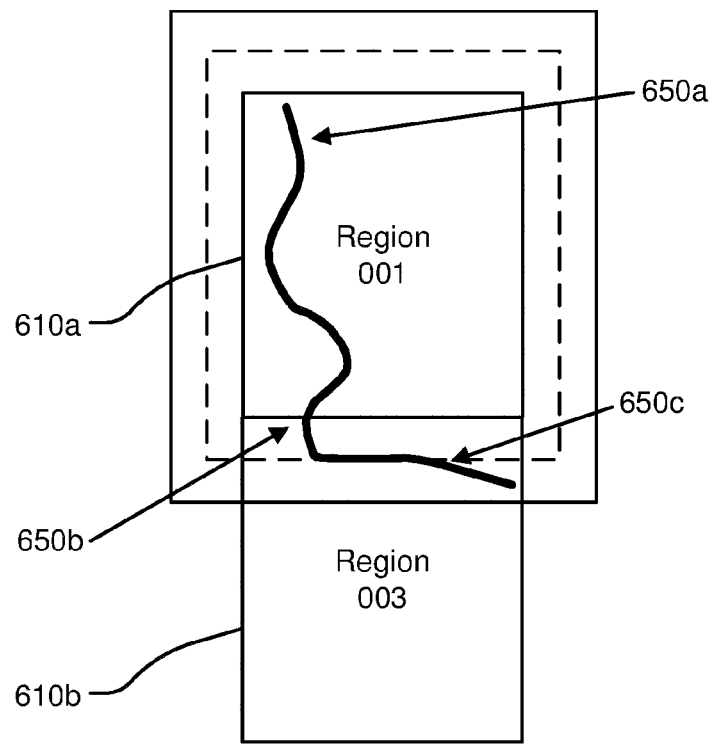

FIGS. 6A-6B illustrate example geographical regions 610*a* and 610*b* that may be defined in an HD map according to one or more embodiments. FIG. 6A illustrates a square geographical region 610*a*. FIG. 6B illustrates two neighboring geographical regions 610*a* and 610*b*. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610*a* and a boundary 630 for a buffer of approximately 100 m around the geographic region 610*a*.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650*a* in the geographical region 610*a*. The corresponding vehicle 150 may traverse along a route to reach a location 650*b* where it may cross the boundary of the geographical region 610 but may stay within the boundary 620 of the buffer. Accordingly, the vehicle computing system 120 of the corresponding vehicle 150 may continue to use the geographical region 610*a* as the current geographical region of the vehicle. Once the corresponding vehicle 150 crosses the boundary 620 of the buffer at location 650*c*, the vehicle computing system 120 may switch the current geographical region of the corresponding vehicle 150 to geographical region 610*b* from geographical region 610*a*. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
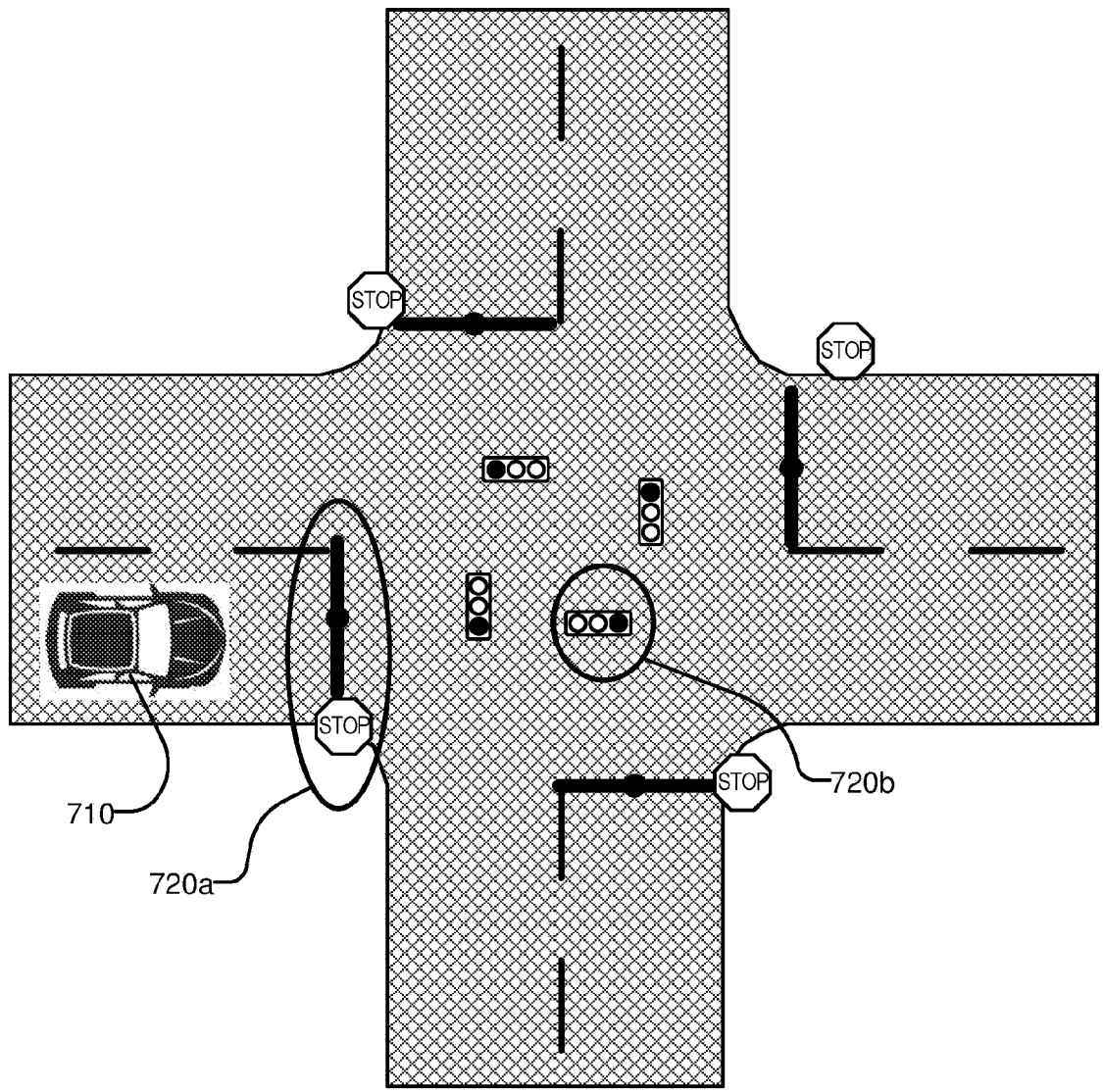
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720*a* and 720*b* that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
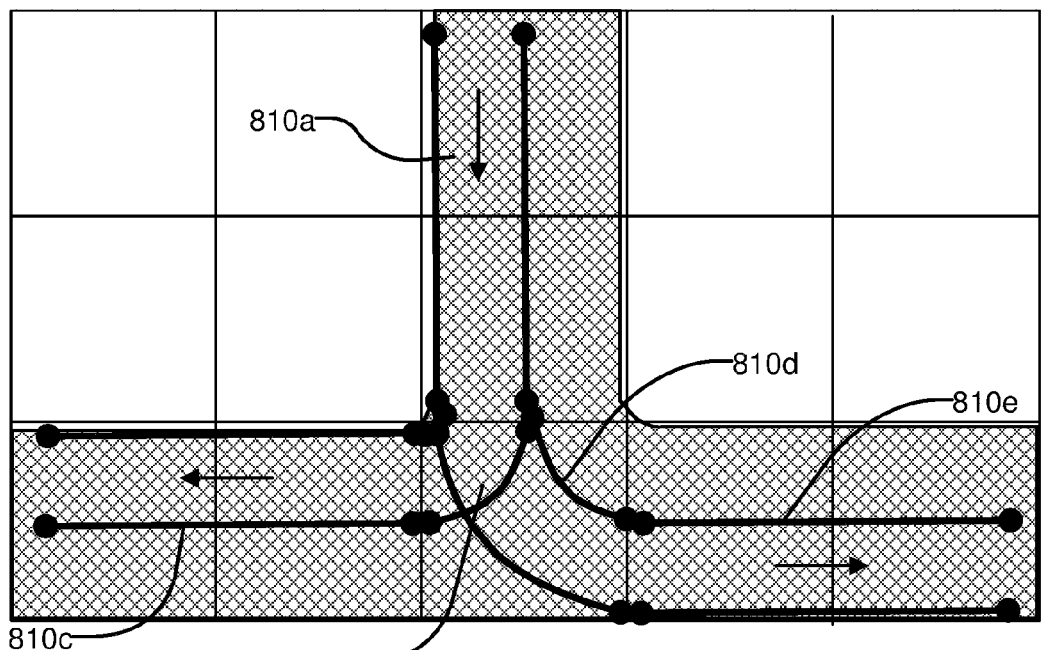
FIGS. 8A-8B illustrates example lane elements and relationships between lane elements in an HD map.
Figure 8B:
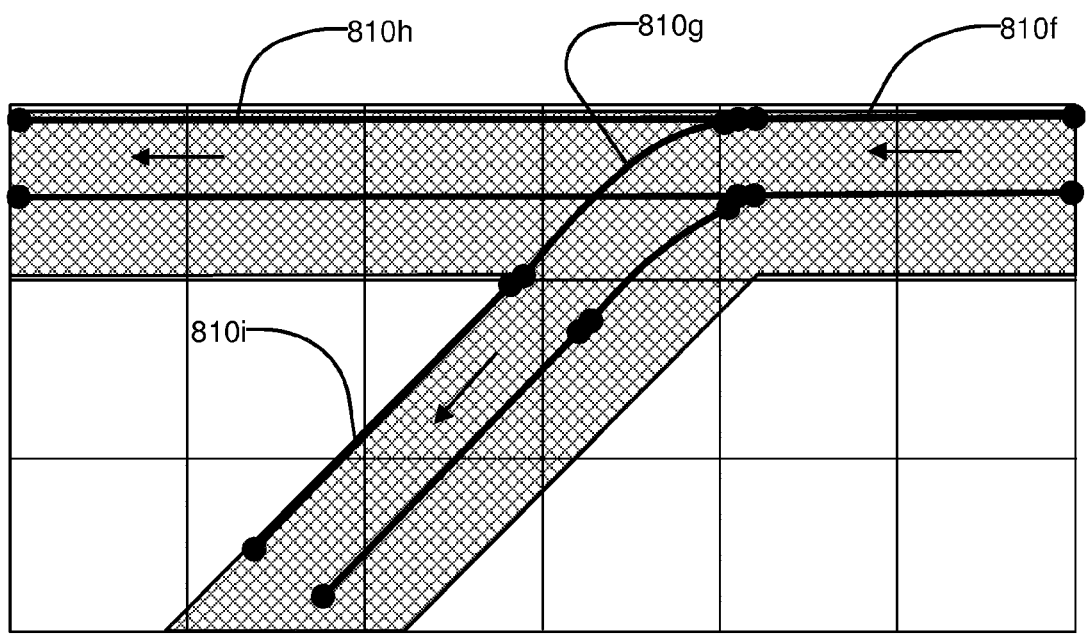

FIGS. 8A-B illustrate lane elements and relations between lane elements in an HD map. FIG. 8A illustrates an example of a T-junction in a road illustrating a lane element 810a that may be connected to lane element 810c via a turn lane 810b and is connected to lane 810e via a turn lane 810d. FIG. 8B illustrates an example of a Y-junction in a road illustrating label 810f connected to lane 810h directly and connected to lane 810i via lane 810g. The HD map system 100 may determine a route from a source location to a destination location as a sequence of connected lane elements that can be traversed to reach from the source location to the destination location.

Iterative-Closest-Point (ICP) Technique

Some embodiments may employ an ICP technique for performing localization. For example, when determining correspondences between point clouds. An ICP technique may be generally employed to minimize the difference between two point clouds. In some embodiments of the ICP technique, one point cloud (e.g., vertex cloud), called the target or reference point cloud, may be kept fixed, while the other point cloud, call the source point cloud, may be transformed to best match the reference point cloud. The ICP technique may iteratively revise the transformation (e.g., combination of translation and rotation) needed to minimize an error metric, usually a distance from the source point cloud to the reference point cloud, such as the sum of squared differences between the coordinates of the matched pairs. The ICP technique may align 3D models (e.g., point clouds) given an initial guess of the transformation required.

In some embodiments, a system receives as input a reference point cloud and a source point cloud, an initial estimation of the transformation to align the source point cloud to the reference point cloud, and some criteria for stopping the iterations. For example, the reference point cloud may be the point cloud of an HD Map (OMap) and the source point cloud may be a LIDAR scan. The system may perform the ICP technique to generate a refined transformation, for example, the transformation to determine the pose of the vehicle (or the LIDAR) given the OMap of the region. For example, for each point in the source point cloud, the system may match the closest point in the reference point cloud (or a selected set). The system may then estimate the combination of rotation and translation which will best align each source point to its match found in the previous step. In some embodiments, the system may use a root mean square point to point distance metric minimization technique for estimating the combination of rotation and translation. The system may next weigh points and reject outliers prior to alignment. The system may then transform the source points using the obtained transformation. The system may next repeat these actions (e.g., by re-associating the points, and so on) until a predetermined stopping criteria is met.

Identifying Non-Static Objects in Point Cloud

Figure 9:
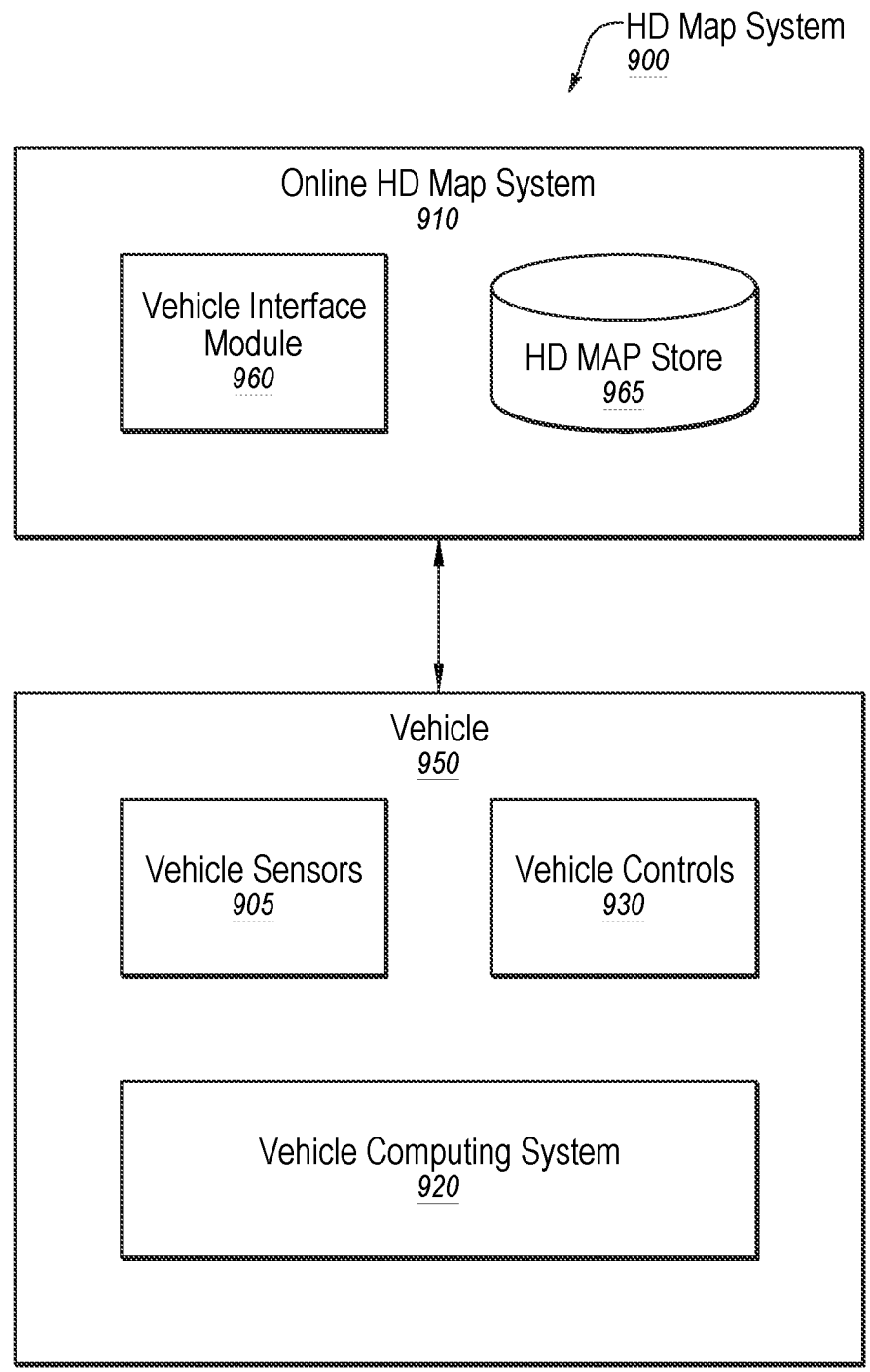
FIG. 9 illustrates an example system configured to identify dynamic objects in a point cloud captured by a vehicle.

FIG. 9 illustrates an example system 900 configured to identify non-static objects (i.e., dynamic objects) in a point cloud captured by sensors of a vehicle 905, for example, by a LIDAR. The system 900 may be analogous to the HD map system 100 of FIG. 1. The system 900 may include an online HD map system 910, vehicle interface module 960, and a HD map store 965, which may be analogous to the online HD map system 110, vehicle interface module 160, and the HD map store 165, respectively of FIG. 1. The system 900 may also include the vehicle 950, which may be analogous to one of the vehicles 150 of FIG. 1. The vehicle 950 may also include vehicle sensors 905, a vehicle computing system 920 ("system 920"), and vehicle controls 930, which may be analogous to the vehicle sensors 105, vehicle computing system 120, and vehicle controls 130, respectively, of FIG. 1.

The online HD map system 910 receives LIDAR scans from several cars that pass through a region. The online HD map system 910 combines the information received in the LIDAR scans to generate a point cloud representation of the region (OMap). Given a collection of tracks (which includes GPS-IMU and LIDAR data), the HD map system 910 performs global alignment that fuses the GPS-IMU and LIDAR data to compute globally consistent vehicle poses (location and orientation) for each LIDAR frame. With the global vehicle poses, the HD map system 910 merges the LIDAR frames as an aggregated point cloud, from which a 3D HD map can be built. The online HD map system 910 includes in the HD map static objects/structures 965 that are common across several point clouds while reducing or omitting dynamic objects in the HD map. Accordingly, the point cloud of the HD map 965 forms ground truth comprising mostly static objects. A dynamic object such as a vehicle may get included in the HD map 965 if it stays in one position for several days. However, such instances are few and unlikely to occur in the HD map 965.

For instance, the vehicle 950 may be driving through a region, and the vehicle computing system 920 may accordingly receive HD map data for the region from the online HD map system 910. This data is used to help create a preliminary pose for the vehicle 950 from which pose the vehicle 950 may begin identifying dynamic objects. The vehicle 950 may receive the data in advance, for example, by specifying the route that the vehicle 950 plans on traveling before the vehicle 950 drives on the route. Alternatively, the system 920 may download portions of the HD map 965 as the vehicle 950 drives along a route, before the vehicle 950 reaches a region. In an embodiment, the vehicle 950 may be provided with the HD map 965 of a region manually, for example, by attaching a storage device.

After a preliminary pose is gathered from the HD map 965, the system 920 begins gathering data to determine which objects are dynamic. The system 920 receives sensor data comprising a point cloud, for example, a LIDAR scan obtained by a LIDAR mounted on the vehicle 950. Sensor data may also include data gathered from GPS, camera images, videos, etc. The system 920 performs segmentation of the points of the point cloud of the LIDAR scan to generate one or more clusters of points. A cluster may comprise one or more segments of points. A segment may be a group of points identified based on one or more shared characteristics of points included therein and based on relative proximity of the points of the segment to each other. In some embodiments, a cluster may comprise of a single segment. Additionally or alternatively, a cluster may comprise of a group of two or more segments connected geographically in which each segment of a respective group is identified as being a piece of a single object. For example, a tree may be composed of a trunk, branches, and leaves. Each of the trunk, branches, and leaves may be represented by a respective segment of points. Together, those segments may form a cluster of points identified by a semantic such as "tree." In some embodiments, the clusters may be identified based on one or more shared characteristics of the points included therein and based on relative proximity of the points of the clusters to each other. A cluster of points may represent an object, marking, structure, etc., such as a road sign, a traffic light, a plant, a building, road markings. This segmentation of points may contribute to the preliminary pose of the vehicle 950. This segmentation of points may also be used in deciding which points in the point cloud originating with the vehicle 950 may be compared with points from the point cloud belonging to the HD map 965.

The system 920 performs segmentation of the point cloud of the HD map 965 to group points of the HD map 965 into sets of points or segments. The system 920 may perform segmentation by performing a region growing technique that starts from one or more points (seed points) featuring specific characteristics and then grows around neighboring points with similar characteristics. The system 920 may perform segmentation using machine learning techniques, such as hierarchical clustering, K-means clustering or mean shift. In an embodiment, once the system 920 performs segmentation of the point cloud, the system labels each segment (group) of points with a class, thereby associating each segment with some semantic. In other words, clusters of various kinds are labeled (e.g., assigned a semantic) after they are formed, thus making them easier to identify. Examples of a point segment semantic may include: height, width, speed, velocity, acceleration, distance from the vehicle 950, distance from the ground, shape, etc. Additionally or alternatively, semantics may include specific objects, such as a stop sign, pole, building, or other object.

In an embodiment, the system 920 separates ground points from non-ground points and identifies dynamic objects only in segments based on non-ground points. On a road, more often than not, there are no objects in the lanes of the road. Therefore, in instances in which ground points in the lanes of a road overlap in any way with other objects when compared with what is depicted on the HD map 965, it is likely that there is a dynamic object present there just based on the other objects with which the ground points are overlapping. Accordingly, in some embodiments, the system may determine ground points by identifying points that are close to the vehicle 950 and immediately in front of the vehicle 950 and fit a plane through those points. The plane is referred to as a ground plane and comprises ground points. In an embodiment, the system 920 determines the ground plane by determining an approximate location of the vehicle 950, for example, through using GPS, and then loading the HD map point cloud at that location and identifying the ground plane in that portion of the point cloud. In another embodiment, the system 920 determines the ground plane by collecting sensor data, for example, by conducting a LIDAR scan and identifying the ground plane in the LIDAR scan. The system 920 has a predetermined estimate of the height of the LIDAR (e.g., based on vehicle manufacturer information). The system uses the height to determine location of ground points and fits a plane through these points. The system 920 determines all points that are not on the ground are non-ground points.

The system 920 finds correspondences of points of the point cloud obtained from the vehicle's 950 LIDAR scan with points of the point cloud of the HD map (which was obtained by combining data from several LIDAR scans). The correspondences may be determined using a process such as ICP (iterative closest point based on determination of nearest neighbor points in two point clouds). After determining which points correspond between the point cloud belonging to the HD map 965 and the point cloud originating with the LIDAR scan of the vehicle 950, the system 920 identifies segments (or clusters or groups or sets of points obtained by segmentation) of the point cloud of the LIDAR scan that have less than a threshold percentage (or fraction) of points having correspondences, for example, segments that have less than 20% of the points with correspondences in the HD map 965. A point p1 is determined to have a correspondence if the system 920 is able to find a corresponding point p2 in the HD map 965 point cloud (point p2 corresponding to point p1) based on ICP. There are segments that the system 920 was unable to map to corresponding segments in the point cloud belonging to the HD map 965. The system 920 marks each of these identified segments as corresponding to a dynamic (or non-static) object. The determination is based on the assumption that dynamic objects are not part of the map and therefore the points of these objects do not have correspondences in the map.

The system 920 may use the determination of the dynamic objects for perception, for example, to make decisions that help with navigation of the object. For example, the system 920 may make a determination that the dynamic objects may move and could come in the path of the vehicle 950 and navigates through the traffic accordingly. For example, the system 920 may analyze the dynamic objects for dynamic movement and may calculate a motion trajectory for the dynamic object to determine whether it is likely to encounter the trajectory of the vehicle 950, thereby causing a collision.

The system 920 may eliminate these points from the alignment of the first point cloud and the second point cloud to determine the pose of the vehicle 950. Alternatively, the system 920 may assign low weights to points of segments marked as dynamic objects and higher weights to other points during the alignment of the first point cloud and the second point cloud. A low weight means there is less chance that that particular point or cluster of points will be used in processes such as the alignment of the first point cloud and the second point cloud. The system 920 uses the pose of the vehicle 950 determined by the alignment of aligning the first point cloud and the second point cloud for navigation of the vehicle 950.

Removal of points corresponding to dynamic objects makes the alignment of the first point cloud and the second point cloud more efficient since there are fewer points to process. Removal of points corresponding to dynamic objects also improves accuracy of aligning the first point cloud and the second point cloud since the dynamic objects should not map to anything in the map and if there is even a fraction of points of the dynamic object that finds correspondences in the map, these points are very likely mapped incorrectly. Therefore, eliminating these entire groups of points corresponding to dynamic objects results in better mapping of remaining points. Even if an object is incorrectly classified as a dynamic object, the accuracy the alignment of the first point cloud and the second point cloud is not significantly affected since there are several objects/structures that can be mapped to perform the alignment of the first point cloud and the second point cloud.

In an embodiment, prior to comparing the point cloud belonging to the HD map and the point cloud originating with the vehicle's 950 lidar scan, the system 920 performs sampling of points of the clusters of points belonging to the point cloud resulting from a lidar scan of the vehicle 950 and finds correspondences of the sampled points in the point cloud belonging to the HD map. This makes the process efficient since the number of points processed is reduced. For example, if a cluster of points is made up of 1000 points, in an embodiment, 100 of those 1000 points would be randomly selected for determining correspondences with the point cloud in the HD map. By determining correspondences with 100 points of a cluster made up of 1000 points, efficiency is increased, while also maintaining a sufficient level of accuracy.

In an embodiment, the system 920 performs sampling of points of these clusters such that points that are not close to ground are given higher preference (they have higher likelihood of being selected for comparison with the point cloud belonging to the HD map). This is so because points closer to the ground are likely to find correspondences in the ground points. These points that find correspondences with ground make it less likely to eliminate the segment as representing a dynamic object since this increases the fraction of points that have correspondences.

In an embodiment, the system 920 determines ground points and non-ground points. The system 920 eliminates ground points from both point clouds and performs matching between non-ground points to identify dynamic objects.

In an embodiment, the system 920 determines correspondences only using objects that are not labeled already as static objects. In other words, the system 920 eliminates static objects from the point cloud created from the vehicle's sensors and performs matching with objects that had not been assigned a semantic clearly indicating a static object. For example, when performing segmentation, an object may be identified as a tree, a pole, a sign, or a shrub. Objects such as these will not be used in determining correspondences because it is easy to determine based solely off the vehicle's sensor data that those objects are static.

The system 900 may accordingly be configured such that dynamic objects may be identified such that the alignment of the first point cloud and the second point cloud may be improved. Further, the identification of the dynamic objects may be such that collision avoidance may be improved. Additionally or alternatively, the identification of the dynamic objects may help allow for updating of HD maps.

Figure 10:
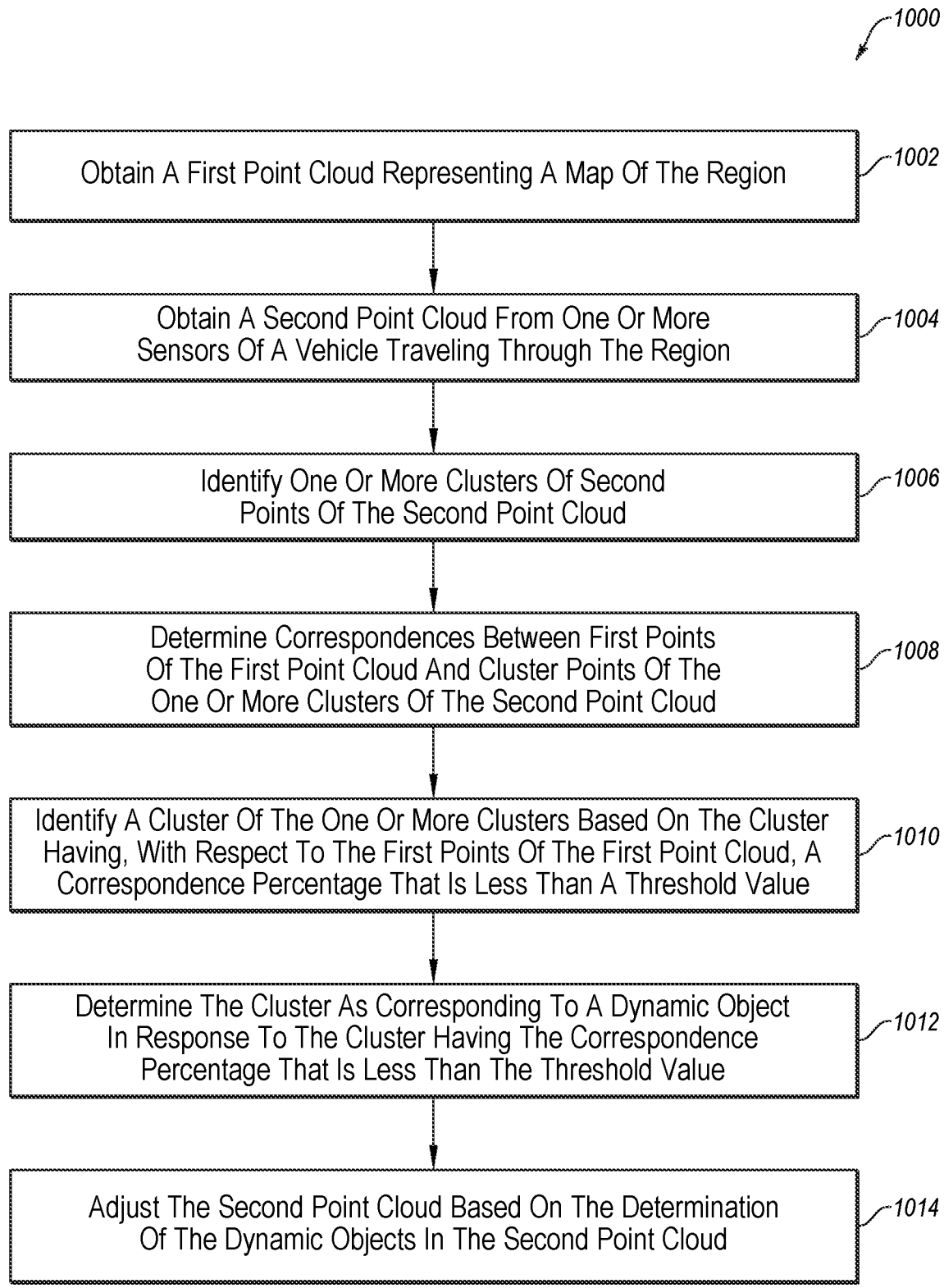
FIG. 10 illustrates an example method of identifying dynamic objects in a point cloud captured by a vehicle.

FIG. 10 is a flowchart of an example method 1000 of identifying dynamic objects in a point cloud captured by a vehicle 950, according to at least one embodiment described in the present disclosure. The method 1000 may be performed by any suitable system, apparatus, or device. For example, one or more elements of the HD map system 900 of FIG. 9 may be configured to perform one or more of the operations of the method 1000. For instance, the vehicle computing system 920 and/or the online HD map system 910 may be configured to perform one or more of the operations associated with the method 1000. Although illustrated with discrete blocks, the steps and operations associated with one or more of the blocks of the method 1000 may be divided into additional blocks, combined into fewer blocks, or eliminated, depending on the particular implementation.

The method 1000 may begin at block 1002 at which a first point cloud representing a map of the region may be obtained. The first point cloud is obtained by aggregating point cloud data obtained from a plurality of tracks. Each track corresponds to a vehicle 950 navigating in the region.

At block 1004, a second point cloud may be obtained from one or more sensors of a vehicle (e.g., the vehicle 905) traveling through the region. In one embodiment, the second point cloud is obtained by one or more LIDAR sensors of the vehicle.

At block 1006, one or more clusters of second points of the second point cloud may be identified. In some embodiments, the one or more clusters may be identified such as described above.

At block 1008, correspondences may be determined. The correspondences may be between first points of the first point cloud and cluster points of the one or more clusters of the second point cloud. In some embodiments, correspondences between the first points of the first point cloud and the cluster points may be determined using an iterative closest point process. Additionally or alternatively, the correspondences may be determined by selecting a sample of cluster points from the cluster. In this way, the correspondences between the first points of the first point cloud and the cluster points of the cluster are only determined with respect to the selected sample of cluster points of the cluster. Thus, improving the efficiency with which correspondences are determined.

At block 1010, a cluster of the one or more clusters may be identified. This identification is based on the identified cluster having, with respect to the first points of the first point cloud, a correspondence percentage that is less than a threshold value. In some embodiments, identifying the cluster comprises performing segmentation of the second point cloud to identify segments of points of the second point cloud in which the segments are identified based on the points of a corresponding segment having a shared characteristic, organizing the segments into the one or more clusters of points of the second point cloud, and assigning weights to the one or more clusters of points to which weights correspond to how useful the one or more clusters of points are in determining which objects are dynamic. In yet another embodiment, identifying the cluster comprises assigning each respective cluster of points a corresponding semantic associated with the shared characteristic of a respective segment of the respective cluster of points.

At block 1012, the identified cluster may be determined as corresponding to a dynamic object. This is done in response to the identified cluster having the correspondence percentage that is less than the threshold value.

At block 1014, the second point cloud may be adjusted for use during navigation of the vehicle. This may be based on the determination of the dynamic object in the second point cloud. In some embodiments, adjusting the second point cloud may include marking the cluster as corresponding to the dynamic object Additionally or alternatively, adjusting the second point cloud for use during navigation of the vehicle comprises removing, from the second point cloud, the cluster points of the cluster in response to the cluster being marked as corresponding to the dynamic objects. In these or other embodiments, the alignment of the first point cloud and the second point cloud may be performed based on the adjusted second point cloud such that cluster points of the cluster are assigned less weight with respect to the aligning of the first point cloud and the second point cloud as compared to remaining points. In these or other embodiments, the second point cloud with the dynamic object clusters removed may be used to update an HD map and corresponding HD map data, such as what may be stored in the HD map stores and/or vehicles described above. Additionally or alternatively, the identification of the dynamic object may be used to perform collision avoidance. As such, the adjusting of the second point cloud may improve one or more of the aligning the first point cloud and the second point cloud, collision avoidance, or updating HD map data of the region.

Modifications, additions, or omissions may be made to the method 1000 without departing from the scope of the present disclosure. For example, the operations of method 1000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Adjusting Weight of Points Based on Geometric Features

Figure 11:
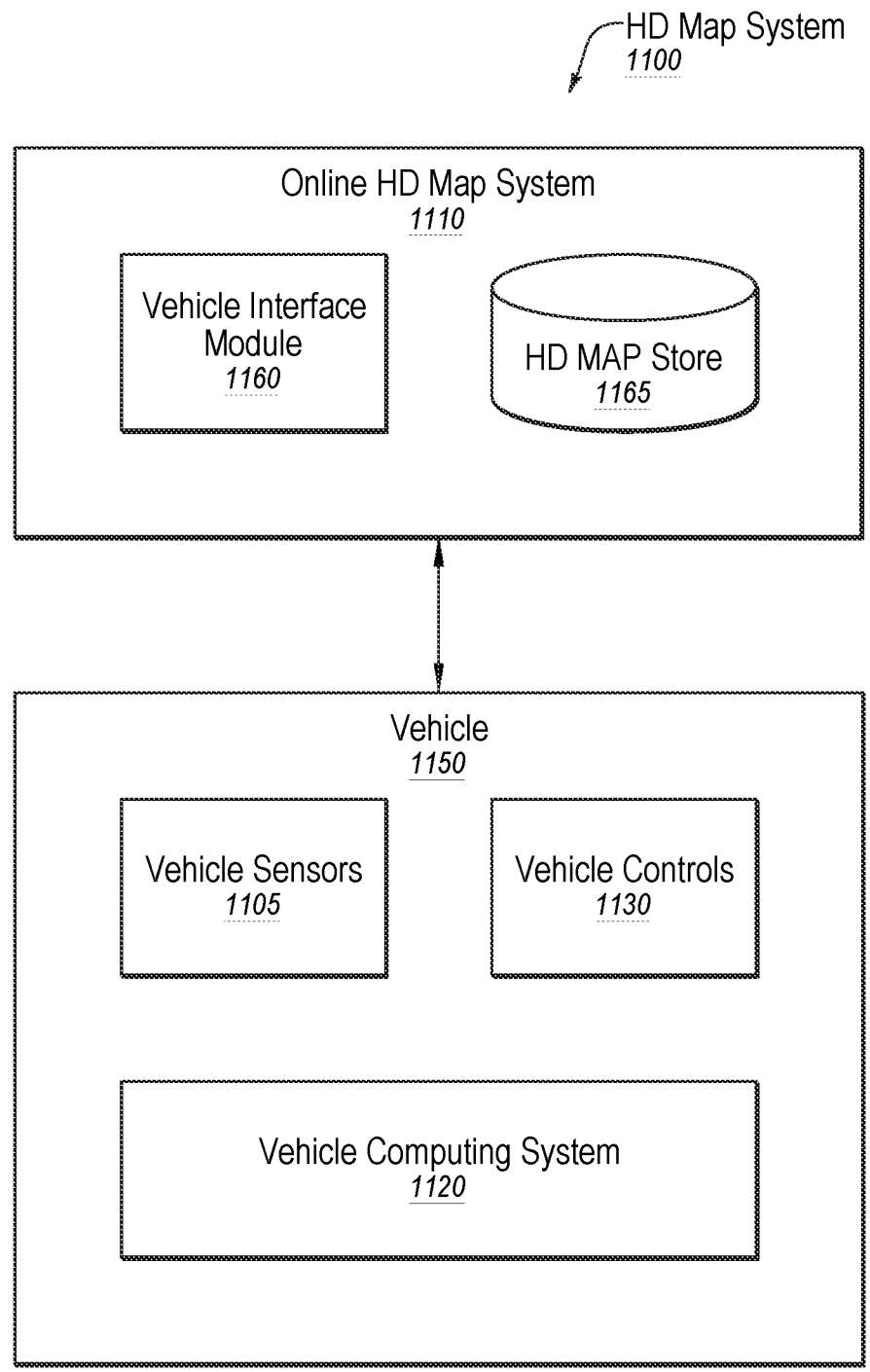
FIG. 11 illustrates an example system configured to determine weights of points of a point cloud based on geometric features.

FIG. 11 illustrates an example system 1100 configured to adjust weights of points of a point cloud based on geometric features. The system 1100 may be analogous to the HD map system 100 of FIG. 1 and the HD map system 900 of FIG. 9. The system 1100 may include an online HD map system 1110, vehicle interface module 1160, and a HD map store 1165, which may be analogous to the online HD map system 110, vehicle interface module 160, and the HD map store 165, respectively of FIG. 1 and the online HD map system 910, vehicle interface module 960, and the HD map store 965, respectively of FIG. 9. The system 1100 may also include the vehicle 1150, which may be analogous to one of the vehicles 150 of FIG. 1 and to one of the vehicles 950 of FIG. 9. The vehicle 1150 may also include vehicle sensors 1105, a vehicle computing system 1120 ("system 1120"), and vehicle controls 1130, which may be analogous to the vehicle sensors 105, vehicle computing system 120, and vehicle controls 130, respectively, of FIG. 1 and the vehicle sensors 905, vehicle computing system 920, and vehicle controls 930, respectively, of FIG. 9.

The system 1100 may obtain a first point cloud. For example, the vehicle computing system 1120 may receive a plurality of LIDAR scans from vehicle sensors 1105 and may aggregate the point cloud data from the plurality of LIDAR scans. The vehicle computing system 1120 may perform segmentation of the points of the first point cloud of the LIDAR scan to generate one or more clusters of points. In some embodiments, segmentation may comprise a process of grouping one or more point clouds into one or more sets of points, one or more sets of segments, or one or more clusters of points, etc. with one or more similar properties, characteristics, etc. The segmentation may be used to label each point of the one or more sets of points, one or more sets of segments, or one or more clusters of points with a corresponding class that the point may represent within an image, set of points, segment, and/or cluster of points. For example, the vehicle computing system 1120 may perform segmentation of the first point cloud and may label each set, segment, and/or cluster of points with a class, thereby associating each segment with one or more semantics.

LIDAR segmentation provides clusters with different types, including but not limited to, ground points; thin, vertical structures (e.g., poles); lane markings; smooth, non-ground surface patches; general-clustered non-ground; and unclustered points. For purposes of sampling, the clusters may be classified in various different categories, including but not limited to, ground point clusters, special clusters, and general (or non-ground point clusters).

In some embodiments, some clusters may be classified as ground clusters. A ground cluster is a cluster that is associated with the ground. In these or other embodiments, ground clusters may be given a lower priority than non-ground clusters with respect to determining correspondences between the first points and respective cluster points of the ground clusters and the non-ground clusters. In some embodiments, the lower priority may be based on ground clusters being identified as less useful in identifying dynamic objects. In these or other embodiments, the lower priority given to the ground clusters may be such that the ground clusters are eliminated from being analyzed with respect to determining correspondences between the first points and respective cluster points of the ground clusters. For ground point clusters, a fixed number of ground points $N_{Ground}$ using local constant density sampling may be sampled.

In some embodiments, some clusters may be classified as special clusters ($N_{Special}^{Desired}$). Special clusters may include points that may represent poles, lane markings, and smooth surface patches. In some embodiments, a sampling strategy for special clusters may be described as follows. In some embodiments, $N_{PerCluster}$ points may be sampled per cluster by finding a desired overall number of sample points $N_{Special}^{Desired}$ by summing over the clusters, the smaller of $N_{PerCluster}$ and $N_{Cluster}^i$. The $i^{th}$ cluster may include $N_{Cluster}^i$ points. In some embodiments, $N_{Special}^{Desired}$ may be subject to a maximum $N_{special}^{Max}$ cluster to provide the number of points $N_{Special}$ to be sampled from the special clusters using local constant density sampling. $N_{Special}^{Desired}$ may be calculated as follows: $N_{Special}^{Desired} = \Sigma_i \min(N_{PerCluster}, N_{Cluster}^i)$. $N_{Special}$ may be calculated as follows: $N_{Special} = \min(N_{Special}^{Desired}, N_{Special}^{Max})$.

In some embodiments, some clusters may be classified as general non-ground point clusters ($N_{NonGround}$). To calculate $N_{NonGround}$, a minimum ($N_{NonGround}^{Min}$) and maximum ($N_{NonGround}^{Max}$) number of points may be specified. $N_{NonGround}$ may be calculated as follows in some embodiments:

$$N_{NonGround} = N_{NonGround}^{Max} + \frac{N_{Special}}{N_{Special}^{Max}} \cdot \left(N_{NonGround}^{Min} - N_{NonGround}^{Max}\right).$$

Special

In some embodiments, cluster types may be mapped to ICP constraints. In some embodiments, ground points may be used as point-to-plane constraints with one or more normals for the planes computed from LIDAR scans. In such cases, the ICP weight factor ($W_{Ground}$) may be adjusted per point and/or correspondence such that the sampled points may have an accumulated weight that may be equal to a given percentage ($W_{Ground}^{Rel}$) with respect to an overall number of sampled points ($N_{Total}$) $W_{Ground}$ may be calculated as follows in some embodiments:

$$W_{Ground} = W_{Ground}^{Rel} \cdot \frac{N_{Total}}{N_{Ground}}$$

where $W_{Ground}^{Rel}$ is in a range from 0 to 1 and the default weight per ICP point/correspondence is 1.

In some embodiments, pole points may be used as point-to-line constraints with a line direction either fixed to the coordinates [0, 0, 1] or estimated from the point cluster. In some embodiments, lane marking points may be used as point-to-line constraints with the line direction derived from the LMap lane lines. In such cases, correspondences are determined via designated polygon indexes that may assist in the location of a nearest neighbor of a given lane marking point to the LMap lane line, which may be represented as a polygon. In some embodiments, points from smooth non-ground surface patches may be used as point-to-plane constraints with one or more normals for the planes that may be computed from LIDAR scans. In some embodiments, general non-ground points including unclustered points may be used as point-to-point constraints. In some embodiments, the purpose of non-static (i.e., dynamic object) detection may be to exclude clusters of points from sampling and ICP and may be performed for most non-ground clusters, including poles and smooth non-ground surface patches.

The system 1100 may determine one or more geometric features of an object corresponding to the one or more segments, clusters of points, or sets of points (e.g., determined via segmentation). For example, the vehicle computing system 1120 may determine one or more geometric features of an object corresponding to the one or more segments, clusters of points, or sets of points. The geometric features may include corners, edges, blobs, ridges, salient points, etc. The geometric features may be determined based on how the cluster of points may be distributed in the three dimensions (for example, the x, y, and z dimensions). For example, the vehicle computing system 1120 may sample the points to reduce the computation complexity and analyze the sampled set of points to determine one or more features of the object corresponding to the cluster. In some embodiments, the vehicle computing system 1120 may analyze the points, for example, to determine the maximum distance between points along various dimensions, for example, x, y, and z dimensions to determine an estimate of the shape of the object/structure.

The vehicle computing system 1120 may determine a shape of an object corresponding to the cluster of points. The shape of the object and/or geometric features of the object may affect the ease and/or efficiency of aligning the first point cloud with the second point cloud. For example, the vehicle computing system 1120 may determine that the shape of the object and/or the geometric features of the object may be a thin vertical structure such as a pole or a tree trunk. The pole or tree trunk may allow the vehicle computing system 1120 to more easily and/or efficiently identify corresponding points between points of the first point cloud and points of the second point cloud than objects of other shapes and/or with other geometric features because the pole or tree trunk may be more easily identified between the first point cloud to the second point cloud. In some embodiments, the vehicle computing system 1120 may assign a higher weight to the points that represent such objects. The vehicle computing system 1120 may assign a lower weight to the points that represent such objects that are less easily identifiable between the first point cloud to the second point cloud. For example, an object that runs horizontally such as a street curb may not allow the vehicle computing system 1120 to more easily and/or efficiently identify corresponding points between points of the first point cloud and points of the second point cloud because the points of the first point cloud and second point cloud may overlap and be less recognizable between the first point cloud and the second point cloud.

The vehicle computing system 1120 may be configured to assign weights to points of point clouds in various ways. In some embodiments, the vehicle computing system 1120 may assign weights to points by adjusting the relative number of points of two or more clusters with respect to each other. For example, if the points of a first cluster correspond to a thin, vertical structure such as a pole and the points of a second cluster correspond to a structure that may be less helpful in aligning the first point cloud with the second point cloud, the vehicle computing system 1120 may obtain additional points that correspond to the second cluster, effectively reducing the weight of the points of the second cluster.

In some embodiments, the vehicle computing system 1120 may assign weights to points by removing points from at least one of two or more clusters. For example, if the points of a first cluster correspond to a thin, vertical structure such as a pole and the points of a second cluster correspond to a structure that may be less helpful in aligning the first point cloud with the second point cloud, the vehicle computing system 1120 may remove a number of points from the first point cloud, effectively increasing the weight of the points of the first point cloud.

In some embodiments, the vehicle computing system 1120 may assign weights to points by prioritizing points differently between points of two or more clusters. In some embodiments, the vehicle computing system 1120 may assign different priorities to points of different clusters such that alignment operations (e.g., ICP operations) favor points given higher priority over points given lower priority. For example, if the points of a first cluster correspond to a thin, vertical structure such as a pole and the points of a second cluster correspond to a structure that may be less helpful in aligning the first point cloud with the second point cloud, the vehicle computing system 1120 may give points of the first point cloud a higher priority and points of the second point cloud a lower priority.

The vehicle computing system 1120 may determine that the structure is a thin vertical structure such as a pole by determining a measure of spread along the various axes. For example, the measure of spread may be a difference between the maximum value of points of the cluster along an axis and the minimum value of points of that cluster along the axis. The vehicle computing system 1120 may use any measure to determine the measure of spread of points, for example, range, quartiles, interquartile range, variance, standard deviation, etc.

In some embodiments, the vehicle computing system 1120 may determine a first measure of spread along a first axis and a second measure of spread along a second axis and may compare the first measure of spread with the second measure of spread to determine a shape of the object corresponding to the cluster of points. The vehicle computing system 1120 may determine that the structure is a thin, vertical structure (e.g., a pole) if the ratio of spread of coordinates along a first axis (e.g., z-axis) and along a second axis and a third axis (e.g., x-axis and y-axis), the first axis, the second axis, and the third axis being perpendicular to each other according to the 3D Cartesian coordinate system, is greater than a threshold value. In some embodiments, the vehicle computing system 1120 may determine an aggregate spread value for the one or more axes (e.g., the average of the spread along the x-axis and y-axis for comparing with the spread along z-axis).

The vehicle computing system 1120 may select one or more clusters of points having a ratio of the measure of spread along the first axis and the measure of spread along the second axis that exceeds threshold value and may assign higher weights to points of the one or more selected clusters and may assign lower weights to points outside of the one or more selected clusters. In some embodiments, the vehicle computing system 1120 may assign higher weights to points on some structures, such as thin, vertical structures, for example, by increasing the likelihood of sampling points from the thin, vertical structures compared to remaining points. The likelihood of sampling points from thin, vertical structures may be increased by increasing the relative number of points representing higher weighted objects, by increasing the weight of points representing higher weighted objects, by reducing the number of points representing lower weighted objects, by reducing the weight of points representing lower weighted objects etc. Accordingly, a point on the thin, vertical structures may have a higher likelihood of being selected for subsequent processing (e.g., for alignment of the first point cloud and the second point cloud) than other points, for example, points on walls. In some embodiment, the vehicle computing system 1120 may not perform sampling of points on the thin, vertical structures but may process one or more points on the thin, vertical structures for subsequent processing (e.g., for the alignment of the first point cloud and the second point cloud) while the vehicle computing system 1120 samples remaining points to reduce their density. In some embodiments, the vehicle computing system 1120 may assign higher weights to points on the thin, vertical structures compared to remaining points for the alignment of the first point cloud and the second point cloud, for example, using ICP.

In some embodiments, the vehicle computing system 1120 may separate ground points from non-ground points and may identify dynamic objects only in one or more sets of points, segments of points, and/or clusters of points based on the non-ground points. For example, the vehicle computing system 1120 may determine ground points by identifying points that may be close to the vehicle 1150 and/or immediately in front of the vehicle 1150 and may fit a plane through those points. The plane may be referred to as a ground plane and may comprise ground points. In some embodiments, the vehicle computing system 1120 may determine the ground plane by determining an approximate location of the vehicle, for example using GPS, may load the HD point cloud at that location, and may identify the ground plane in that portion of the point cloud. The vehicle computing system 1120 may determine the ground plane by collecting sensor data, for example, from a LIDAR scan and may identify the ground plane in the LIDAR scan. In some embodiments, the vehicle computing system 1120 may have a predetermined estimate of the height of the LIDAR (e.g., based on vehicle manufacturer information). For example, the vehicle computing system 1120 may use the height of the LIDAR to determine location of ground points and may fit a plane through one or more of the ground points. In some embodiments, the vehicle computing system 1120 may determine all points that are not on the ground as non-ground points.

In some embodiments, the vehicle computing system 1120 may classify the points as ground points and non-ground points and may perform segmentation and analysis of clusters for specific geometric structures only on non-ground points, thereby excluding the ground points from consideration.

The system 1100 may obtain a second point cloud. For example, the vehicle computing system 1120 may receive a second point cloud representing points on an HD map (which may be obtained by combining data from several LIDAR scans).

The system 1100 may align the first point cloud and the second point cloud. The alignment of the first point cloud and the second point cloud may be based on the respective weights of various clusters of the first point cloud. The respective weights may be based on respective geometric features that correspond to the respective clusters, such as one or more edges of a thin vertical structure such as a pole or a tree trunk.

The system 1100 may assign a plurality of weights based on the respective geometric features that corresponds to the one or more segments, clusters of points, or sets of points. In some embodiments, the online HD map system 110 may perform sampling of one or more segments, clusters of points, or sets of points based on the plurality of the respective weights of the one or more segments, clusters of points, or sets of points such that segments, clusters of points, or sets of points with higher weights may have a higher likelihood of being selected. As a result, in some embodiments, the operations performed with respect to the selected points may be biased toward points with higher weights.

The assignment of weights based on the respective geometric features that correspond to the one or more segments, clusters of points, or sets of points may include filtering one or more points of the plurality of clusters of points. The system 1100 may filter one or more points based on the respective geometric features that may correspond to the one or more segments, clusters of points, or sets of points and/or the weights of the one or more points. In some embodiments, the system 1100 may filter out one or more points that may be determined to have less than a threshold weight or that may be determined to be less helpful than other points in the alignment of the first point cloud and the second point cloud. In some embodiments, the system 1100 may remove one or more points from the plurality of clusters of points that may be determined to have less than a threshold weight or that may be determined to be less helpful than other points in the alignment of the first point cloud and the second point cloud. In some embodiments, the system 1100 may filter one or more points of the plurality of clusters of points into various categories based off of the respective geometric features and/or respective weights of the one or more points of the plurality of clusters of points. In some embodiments, the system may ignore one or more filtered points based on the respective geometric features and/or respective weights of the one or more points. The filtering of the one or more points of the plurality of clusters of points may improve the speed and/or ease of aligning the first point cloud and the second point cloud and/or may be conserve resources required to run the method 1200 explained in further detailed below.

The correspondences may be determined using a process such as ICP (iterative closest point based on determination of nearest neighbor points in the first point cloud and the second point cloud). A point p1 in the first point cloud is determined to have a correspondence if the vehicle computing system 1120 is able to find a corresponding point p2 in the second point cloud (point p2 corresponding to point p1) based on ICP.

In some embodiments, the processing disclosed herein may provide significant advantages in geographical regions where there may be few features in the scene around the vehicle, for example, because the vehicle may be surrounded by other vehicles or because the vehicle may be driving on a highway outside a city in a flat terrain (e.g., flat land with fields or mostly grass around with only few trees and bushes or traffic signs to help perform localization).

Figure 12:
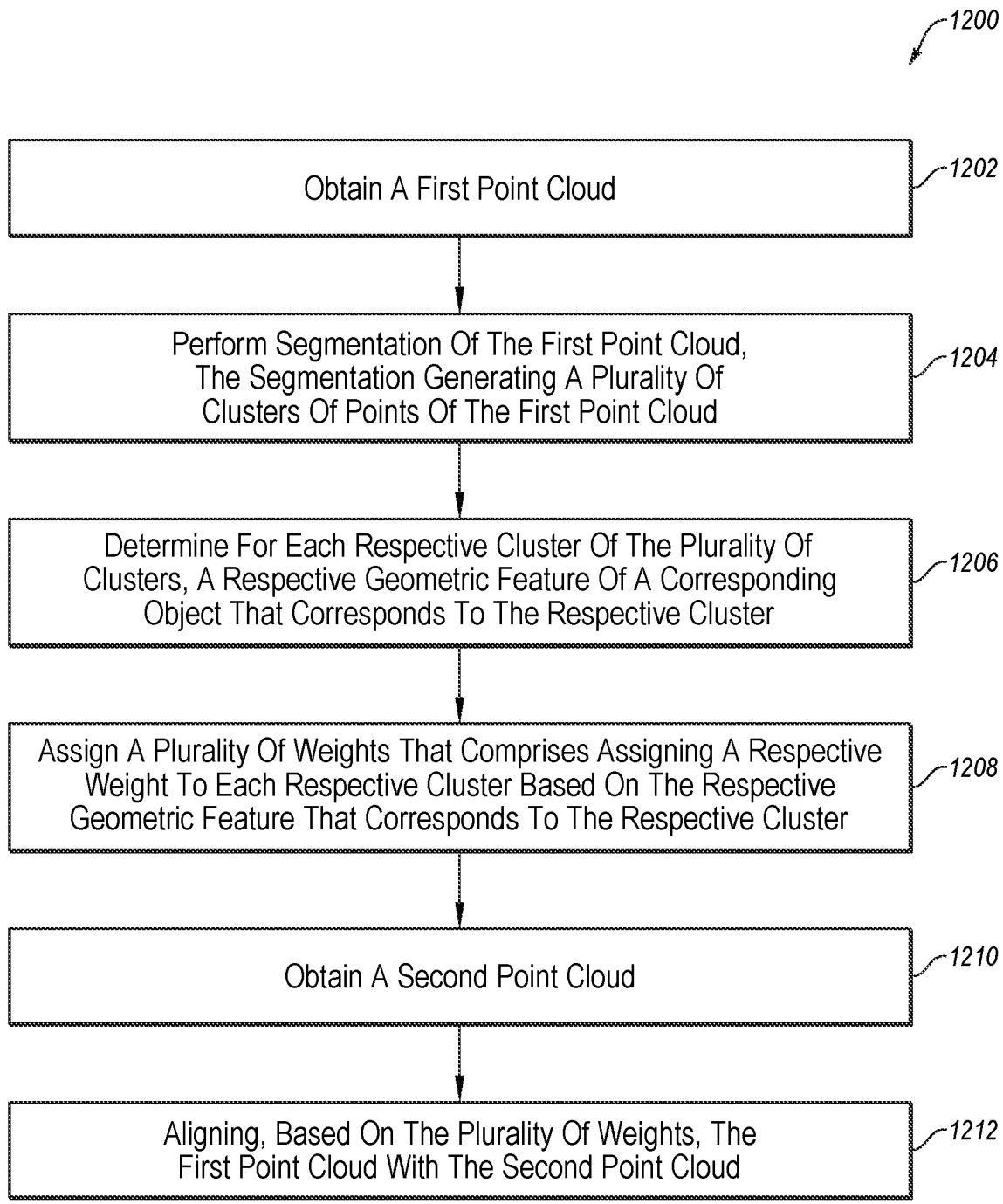
FIG. 12 illustrates an example method of determining weights of points of a point cloud based on geometric features.

FIG. 12 is a flowchart of an example method 1200 of an example method of determining weights of points of a point cloud captured by a vehicle 1150 based on geometric features, according to at least one embodiment described in the present disclosure. The method 1200 may be performed by any suitable system, apparatus, or device. For example, one or more elements of the HD map system 1100 of FIG. 11 may be configured to perform one or more of the operations of the method 1200. For instance, the vehicle computing system 1120 and/or the online HD map system 1110 may be configured to perform one or more of the operations associated with the method 1200. Although illustrated with discrete blocks, the steps and operations associated with one or more of the blocks of the method 1200 may be divided into additional blocks, combined into fewer blocks, or eliminated, depending on the particular implementation.

The method 1200 may begin at block 1202 at which a first point cloud may be obtained. The online HD map system 1110 may combine the information received in the LIDAR scans to generate the first point cloud representation of the region.

At block 1204, segmentation of the first point cloud may be performed. The segmentation may generate a plurality of clusters of points of the first point cloud. The vehicle computing system 1120 may perform segmentation of the points of the first point cloud to generate a plurality of clusters of points. In some embodiments, segmentation may comprise a process of grouping one or more point clouds into one or more sets of points, one or more sets of segments, or one or more clusters of points, etc. with one or more similar properties, characteristics, etc.

At block 1206, a respective geometric feature of a corresponding object that corresponds to the respective cluster may be determined for each respective cluster of the plurality of clusters. In some embodiments, the respective geometric feature of the corresponding object may be determined as described above.

At block 1208, a plurality of weights may be assigned. The assigning may comprise assigning a respective weight to each respective cluster based on the respective geometric feature that corresponds to the respective cluster. Some geometric features are more favorable to the alignment of point clouds than other geometric features. For example, a higher weight may be assigned to a first cluster of points that corresponds to a pole of a street sign. Additionally or alternatively, a lower weight may be assigned to a second cluster of points that corresponds to an interior portion of a face of the street sign. In some embodiments, assigning the lower weight to the second cluster of points may comprise removing the second cluster of points from the first point cloud. In this way, the removal of one or more clusters of points from the first point cloud or assigning a lower weight to one or more clusters of points may reduce the quantity of correspondences which may be used to align the first point cloud and the second point cloud or may deemphasize the influence of one or more clusters of points in the alignment the first point cloud and the second point cloud, as described in block 1212. Thus, improving the efficiency of the determining of the location of the vehicle based on the one or more correspondences between one or more points of the first point cloud and one or more points of the second point cloud.

In some embodiments, the geometric features may be determined based on how the one or more cluster of points may be distributed in the three dimensions (for example, the x, y, and z dimensions). The determining the one or more geometric features may comprise determining a measure of spread of points along a plurality of axes as described above. The determining the one or more geometric features may comprise comparing the measure of spread along a first axis with a measure of spread along a second axis to determine a shape of the object corresponding to the one or more clusters of points as described above. In some embodiments, the first axis is normal to a horizontal plane and the second axis is parallel to the horizontal plane and the determining the shape of the object corresponding to the one or more clusters of points may comprises determining whether a ratio of the measure of spread along the first axis and the measure of spread along the second axis exceeds a threshold value. In some embodiments, one or more clusters of points having a ratio of the measure of spread along the first axis and the measure of spread along the second axis that exceeds a threshold value may be selected. Higher weights may be assigned to points of one or more selected clusters, and lower weights may be assigned to points outside of one or more selected clusters.

In some embodiments, correspondences between the first points of the first point cloud and the cluster points based on the one or more geometric features of the object may be determined using an iterative closest point process. Additionally or alternatively, the correspondences may be determined by selecting a sample of cluster points from the one or more clusters of points based on the one or more geometric features of the object. In this way, the correspondences between the first points of the first point cloud and the second point cloud may only be determined with respect to the selected sample of the one or more clusters of points based on the one or more geometric features of the object. Thus, improving the efficiency with which correspondences are determined.

In some embodiments, the vehicle computing system 1120 may classify one or more points of the first point cloud as ground points or non-ground points. The vehicle computing system 1120 may determine ground points by identifying points that may be close to the vehicle 1150 and/or immediately in front of the vehicle 1150 and may fit a plane through those points. In some embodiments, the vehicle computing system 1120 may classify the points as ground points and non-ground points and may perform segmentation and analysis of clusters for specific geometric structures only on non-ground points, thereby excluding the ground points from consideration. Thus, improving the efficiency of the segmentation of the first point cloud which generates one or more clusters of points of the point cloud, the determination of the one or more geometric features of the object corresponding to the one or more clusters of points, the determination of one or more correspondences between the one or more points of the first point cloud and one or more points of the second point cloud based on the one or more geometric features of the object corresponding to the one or more clusters of points, and the determination of the location of the vehicle based on the one or more correspondences between one or more points of the first point cloud and one or more points of the second point cloud.

At block 1210, a second point cloud may be obtained. The second point cloud may be obtained by combining data from several LIDAR scans.

At block 1212, the first point cloud with the second point cloud may be aligned based on the plurality of weights.

Modifications, additions, or omissions may be made to the method 1000 without departing from the scope of the present disclosure. For example, the operations of method 1000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Computing Machine Architecture

Figure 13:
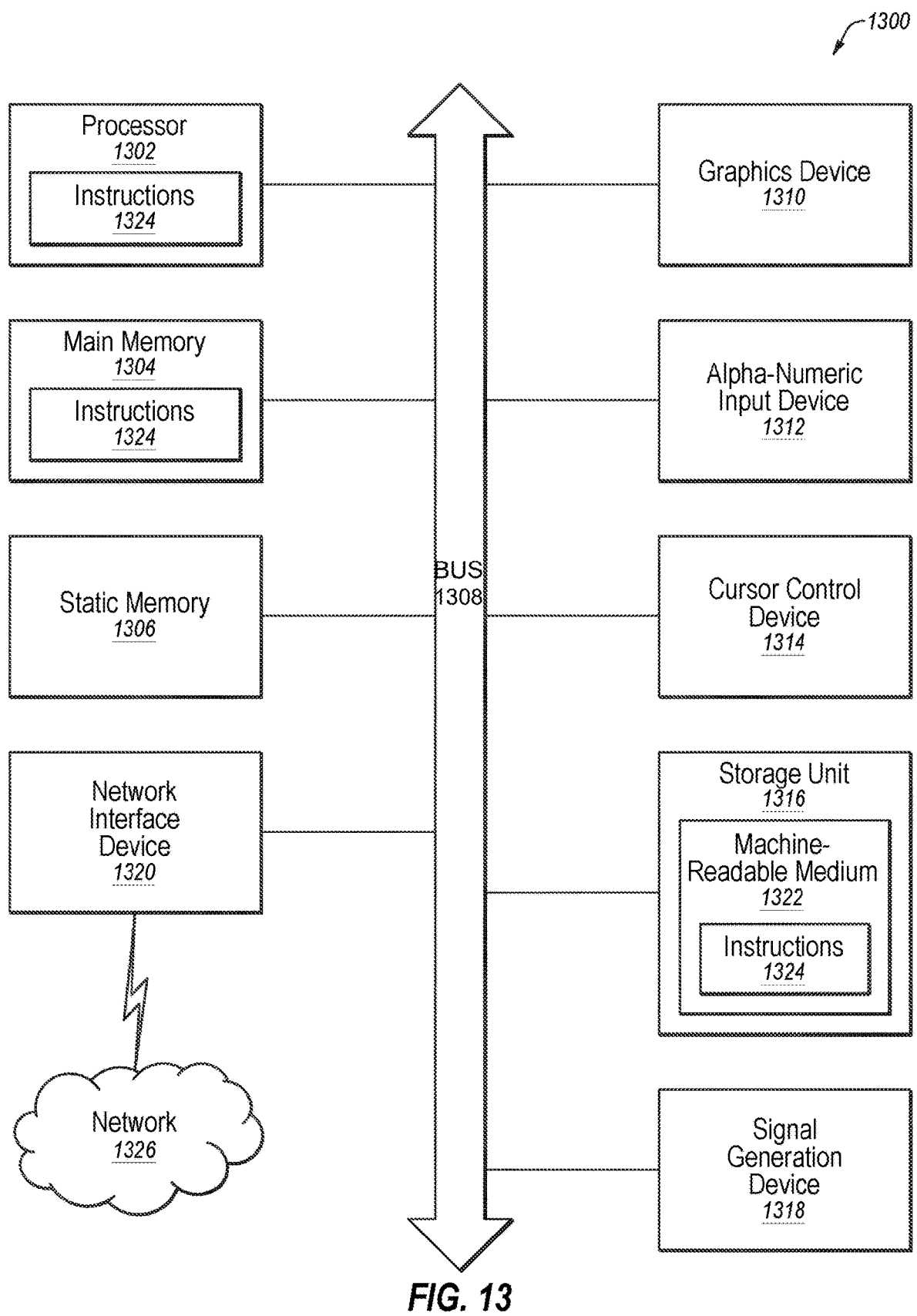
FIG. 13 illustrates an example embodiment of a computing machine that can read instructions from a machine-readable medium and execute the instructions in a processor or controller.

FIG. 13 is a block diagram illustrating components of an example computer system able to read instructions from a machine-readable medium and execute them in a processor (or controller). Specifically, FIG. 13 shows a diagrammatic representation of a machine in the example form of a computer system 1300 within which instructions 1324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 may be part of or may be any applicable system described in the present disclosure. For example, the online HD map system 910 and/or the vehicle computing systems 920 described above may comprise the computer system 1100 or one or more portions of the computer system 1300. Further, different implementations of the computer system 1300 may include more or fewer components than those described herein. For example, a particular computer system 1300 may not include one or more of the elements described herein and/or may include one or more elements that are not explicitly discussed.

The example computer system 1300 includes a processor 1302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1304, and a static memory 1306, which are configured to communicate with each other via a bus 1308. The computer system 1300 may further include graphics display unit 1310 (e.g., a plasma display panel (PDP), a liquid crystal display (LCD), a projector, or a cathode ray tube (CRT)). The computer system 1300 may also include alphanumeric input device 1312 (e.g., a keyboard), a cursor control device 1314 (e.g., a mouse, a trackball, a joystick, a motion sensor, or other pointing instrument), a storage unit 1316, a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 (e.g., software) may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 (e.g., software) may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., instructions 1324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description has been presented for the purpose of illustration; it is not intended to be exhaustive or to be limiting in any way. Persons skilled in the relevant art may appreciate that many modifications and variations may be possible in light of the above disclosure.

For example, although the techniques described herein may be applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein may also be applied for displaying maps for purposes of computer simulation, for example, in computer games, etc.

Some portions of this description may describe the embodiments in terms of algorithms and symbolic representations of operations on information. These algorithmic descriptions and representations may be commonly used by those skilled in the data processing arts to convey the substance of their work effectively to others skilled in the art. These operations, while described functionally, computationally, or logically, may be understood to be implemented by computer programs or equivalent electrical circuits, microcode, etc. Furthermore, it may be proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module may be implemented with a computer program product comprising a computer-readable medium containing computer program code, which may be executed by a computer processor for performing any or all of the steps, operations, or processes described.

Embodiments may also relate to an apparatus for performing the operations herein. This apparatus may be specially constructed for the disclosed purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal may include any embodiment of a computer program product or other data combination described herein. The computer data signal may be a product that may be presented in a tangible medium or carrier wave and modulated or otherwise encoded in the carrier wave, which may be tangible, and transmitted according to any suitable transmission method.

In addition, the language used in the specification may have been principally selected for readability and instructional purposes and may not have been selected to delineate or circumscribe the inventive subject matter. It may therefore be intended that the scope of the invention may not be limited by this detailed description but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (e.g., stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   identifying a cluster of points of a first point cloud;
   determining a percentage of points of the cluster of points that are identified as corresponding to respective points of a second point cloud;
   determining that the cluster of points corresponds to a dynamic object based at least on the percentage;
   based at least on the cluster of points corresponding to the dynamic object, removing the cluster of points from the first point cloud to generate an updated first point cloud; and
   determining a location of an autonomous or semi-autonomous machine based at least on the updated first point cloud, wherein the autonomous or semi-autonomous machine performs one or more navigation or control operations for maneuvering based at least on the location of the autonomous or semi-autonomous machine.

2. The method of claim 1, wherein the determining that the cluster of points corresponds to the dynamic object based at least on the percentage is based at least on the percentage being less than a threshold.

3. The method of claim 1, wherein the determining that the cluster of points corresponds to the dynamic object is further based at least on the cluster of points being identified as non-ground points.

4. The method of claim 1, wherein the cluster of points is designated for determining whether the points of the cluster of points correspond to respective points of the second point cloud based at least on the cluster of points being identified as non-ground points.

5. The method of claim 4, wherein the determining whether the points of the cluster of points correspond to respective points of the second point cloud includes comparing the points of the cluster of points only with non-ground points of the second point cloud.

6. A processor comprising processing circuitry to cause performance of operations, the operations comprising:
- identifying a cluster of points of a first point cloud;
- determining a percentage of points of the cluster of points that are identified as corresponding to respective points of a second point cloud;
- adjusting the first point cloud based at least on the percentage to generate an adjusted first point cloud; and
- causing an autonomous or semi-autonomous machine to perform one or more navigation or control operations for maneuvering based at least on the adjusted first point cloud.

7. The processor of claim 6, wherein the adjusting of the first point cloud includes one or more of:
- removing the cluster of points from the first point cloud;
- designating the cluster of points as corresponding to a dynamic object; or
- assigning a first weight to the cluster of points, the first weight relating to use of the cluster of points with respect to aligning the first point cloud with the second point cloud; or
- assigning a second weight to the cluster of points, the second weight relating to whether the cluster of points corresponds to the dynamic object.

8. The processor of claim 7, wherein the designating the cluster of points as corresponding to the dynamic object based at least on the percentage is based at least on the percentage being less than a threshold.

9. The processor of claim 7, wherein the designating the cluster of points as corresponding to the dynamic object is based at least on the cluster of points being identified as non-ground points.

10. The processor of claim 6, wherein the one or more navigation or control operations include one or more of:
- performing localization of the autonomous or semi-autonomous machine; or
- a perception operation of the autonomous or semi-autonomous machine.

11. The processor of claim 6, wherein the cluster of points is designated for determining whether the points of the cluster of points correspond to respective points of the second point cloud based at least on the cluster of points being identified as non-ground points.

12. The processor of claim 11, wherein the determining whether the points of the cluster of points correspond to respective points of the second point cloud includes excluding non-ground points of the second point cloud from being compared with the points of the cluster of points.

13. A system comprising:
- one or more processing units to cause performance of one or more navigation or control operations for maneuvering an autonomous or semi-autonomous machine based at least on:
  - an adjusted point cloud that is generated based at least on adjusting a first point cloud according to a percentage of points of a cluster of points of the first point cloud that are identified as corresponding to respective points of a second point cloud.

14. The system of claim 13, wherein the adjusting of the first point cloud includes one or more of:
- removing the cluster of points from the first point cloud;
- designating the cluster of points as corresponding to a dynamic object;
- assigning a first weight to the cluster of points, the first weight relating to use of the cluster of points with respect to aligning the first point cloud with the second point cloud; or
- assigning a second weight to the cluster of points, the second weight relating to whether the cluster of points corresponds to the dynamic object.

15. The system of claim 13, wherein the adjusting of the first point cloud is based at least on the percentage satisfying a threshold.

16. The system of claim 13, wherein the adjusting of the first point cloud is based at least on the cluster of points being identified as non-ground points.

17. The system of claim 13, wherein the one or more navigation or control operations include one or more of:
- performing localization of the autonomous or semi-autonomous machine;
or
- a perception operation of the autonomous or semi-autonomous machine.

18. The system of claim 13, wherein the cluster of points is designated for determining whether the points of the cluster of points correspond to respective points of the second point cloud based at least on the cluster of points being identified as non-ground points.

19. The system of claim 18, wherein the determining whether the points of the cluster of points correspond to respective points of the second point cloud includes excluding non-ground points of the second point cloud from being compared with the points of the cluster of points.

* * * * *